(12) United States Patent
Lalancette et al.

(10) Patent No.: US 8,409,542 B2
(45) Date of Patent: Apr. 2, 2013

(54) METHOD AND SYSTEM FOR THE PRODUCTION OF POTASSIUM SULFATE FROM POTASSIUM CHLORIDE

(75) Inventors: Jean-Marc Lalancette, Sherbrooke (CA); David Lemieux, Thetford Mines (CA); Bertrand Dubreuil, Trois-Rivieres (CA)

(73) Assignee: Nichromet Extraction Inc. (CA)

( * ) Notice: Subject to any disclaimer, the term of this patent is extended or adjusted under 35 U.S.C. 154(b) by 59 days.

(21) Appl. No.: 13/160,040

(22) Filed: Jun. 14, 2011

(65) Prior Publication Data

US 2012/0321547 A1 Dec. 20, 2012

(51) Int. Cl.
*C01D 5/10* (2006.01)
*B01J 19/00* (2006.01)

(52) U.S. Cl. ........ 423/552; 422/187; 422/600; 422/608; 422/616

(58) Field of Classification Search .................. 423/552; 422/187, 600, 608, 616
See application file for complete search history.

(56) References Cited

U.S. PATENT DOCUMENTS

| | | | |
|---|---|---|---|
| 3,423,171 A | 1/1969 | Hoppe et al. | |
| 3,436,175 A | 4/1969 | Atwood et al. | |
| 3,615,174 A | 10/1971 | Lewis | |
| 4,056,599 A | 11/1977 | Fox, III et al. | |
| 4,195,070 A | 3/1980 | Allain et al. | |
| 4,341,752 A | 7/1982 | Groenhof | |
| 4,533,536 A | 8/1985 | Bichara et al. | |
| 4,707,347 A * | 11/1987 | Vajna et al. | 423/552 |
| 5,549,876 A * | 8/1996 | Zisner et al. | 423/199 |
| 6,315,976 B1 * | 11/2001 | Phinney | 423/551 |
| 7,604,792 B2 * | 10/2009 | Fairchild | 423/551 |
| 7,780,941 B1 | 8/2010 | Lalancette et al. | |
| 7,887,776 B2 | 2/2011 | Finkelshtein et al. | |
| 2002/0114759 A1 * | 8/2002 | Cabello-Fuentes | 423/482 |

FOREIGN PATENT DOCUMENTS

| | | |
|---|---|---|
| CA | 521086 A | 1/1956 |
| CA | 633571 A | 12/1961 |
| CA | 879581 A | 8/1971 |
| CA | 931325 A2 | 8/1973 |
| CA | 938081 A1 | 12/1973 |
| CA | 1142324 A1 | 3/1983 |
| CA | 2040109 A1 | 10/1991 |
| CA | 2464642 A1 | 5/2003 |
| DE | 2029984 A1 | 12/1971 |

OTHER PUBLICATIONS

"Big Quill Resources Inc. Home Page", [on-line]. [retrieved Jun. 23, 2011]. Retrieved from the Internet: <URL: http://www.bigquill.com/index.html, (2011), 1 pg.

Remy, H., *Treatise on Inorganic Chemistry, vol. 1—Introduction and Main Groups of the Periodic Table*, Elsevier Publishing Company, (1956), p. 199.

Shreve, N. R., "Mannheim process", *Chemical Process Industries*, (Third Edition, McGraw-Hill Book Company), (1967), p. 346.

"International Application No. PCT/CA2012/050253, International Search Report and Written Opinion mailed Jul. 16, 2012", 8 pgs.

* cited by examiner

*Primary Examiner* — Timothy Vanoy

(74) *Attorney, Agent, or Firm* — Schwegman Lundberg & Woessner, P.A.

(57) ABSTRACT

A method and a system for the production of potassium sulfate. The method comprises reacting a chloride of potassium with a magnesium sulfate in an aqueous alcoholic solution, with recycling of magnesium sulfate and production of hydrochloric acid, where the recycling of magnesium is done by a reaction of sulfuric acid on resulting magnesium chloride with corresponding production of magnesium sulfate and hydrochloric acid.

9 Claims, 2 Drawing Sheets

METHOD AND SYSTEM FOR THE PRODUCTION OF POTASSIUM SULFATE FROM POTASSIUM CHLORIDE

FIELD OF THE INVENTION

The present invention relates to fertilizers. More specifically, the present invention concerns the production of a chlorine-free potassium sulfate from potassium chloride.

BACKGROUND OF THE INVENTION

Potassium is an important fertilizer and it is found in nature as salts such as sylvinite (NaCl. KCl), carnallite ($KCl.MgCl_2.6H_2O$) or kainite ($KCl.MgSO_4.3H_2O$). Most of the potassium made available for fertilizer uses is in the form of potassium chloride. But with intensive cultures, the chlorine combined with the potassium in potassium chloride has undesirable effects on soil, and therefore a chlorine-free potassium is desirable, generally a sulfate of potassium and magnesium. In many instances, however, pure potassium sulfate, $K_2SO_4$, would be desirable because of its high potassium content.

This has led to the development of techniques for the production of potassium sulfate from naturally occurring sources of potassium. One of these methods (Treatise on Inorganic Chemistry, H. Remy, Vol. 1, p. 199, Elsevier Publishing Co., 195) calls for the treatment of schönite with a solution of KCl, according to the following reaction:

$$K_2SO_4.MgSO_4.6H_2O + 2KCl \rightarrow 2K_2SO_4 + MgCl_2.6H_2O$$

In practice, it has been found very difficult to obtain a potassium sulfate essentially free of magnesium chloride with this approach, the mother liquor of this crystallization leaving several percent of chloride ions in the end product $K_2SO_4$.

More recently, a thermal method (Mannheim process, Chemical Process Industries, R. N. Shreeve, McGraw-Hill, 3rd ed., 1967, p. 346) has been implemented to obtain potassium sulfate directly by the reaction of potassium chloride with sulfuric acid, as follows:

$$2KCl + H_2SO_4 \rightarrow K_2SO_4 + 2HCl$$

This reaction is conducted at 450° C. in silica reactors, with very poor thermal efficiencies and fast degradation of the reactor, the species involved, sulfuric acid, potassium hydrogen sulfate and potassium sulfate being highly corrosive.

Another existing approach to obtain potassium sulfate from potash and sulfuric acid calls upon the use of ion exchange resin (Big Quill Resources Inc. website homepage: www.bigquill.com). This approach leads to a multiplicity of solutions, which renders this approach costly and complex.

Therefore, there is still a need in the art for a method and a system for the production of potassium sulfate.

SUMMARY OF THE INVENTION

More specifically, there is provided a method for the production of potassium sulfate comprising reacting a source of water soluble potassium with a magnesium sulfate-containing substance in presence of an aqueous alcoholic solution.

There is further provided a system for the production of potassium sulfate, comprising a first reactor for dissolving a water soluble potassium in water into a first solution; a second reactor for dissolving magnesium sulfate hydrate in water and adding methanol into a second solution; a third reactor, adapted to receive the first and the second solutions, mixed then under stirring and cool them down into a slurry; a filter collecting and filtering the slurry from the third reactor; delivering, after rinsing of the solid part with methanol, chloride-free potassium sulfate, and a combined filtrate and rinsings; a column receiving and distilling the combined filtrate and rinsings, delivering methanol back to the second reactor and to the filter and a concentrated solution of magnesium chloride; a fourth reactor, adapted to receive the concentrated solution of magnesium chloride, which crystallizes upon cooling, and to treat the concentrate with sulfuric acid, delivering hydrochloric acid and a residual mass; a collector, adapted to absorb the hydrochloric acid delivered form the fourth reactor; and a fifth reactor, adapted to collect and crystallise the residual mass from the fourth reactor, for recycling to the second reactor as magnesium sulfate heptahydrate.

Other objects, advantages and features of the present invention will become more apparent upon reading of the following non-restrictive description of embodiments thereof, given by way of example only with reference to the accompanying drawings.

DESCRIPTION OF EMBODIMENTS OF THE INVENTION

In a nutshell, the present invention provides a method and a system for the production of chlorine-free potassium sulfate ($K_2SO_4$) from a source of potassium, such as potassium chloride (KCl) for example, and a magnesium sulfate-containing substance, such as magnesium sulfate heptahydrate ($MgSO_4.7H_2O$) for example.

The method generally comprises reacting KCl with $MgSO_4.7H_2O$ in the presence of a low boiling point alcohol such as methanol (MeOH) to yield $K_2SO_4$ and magnesium chloride hexahydrate ($MgCl_2.6H_2O$). $MgCl_2.6H_2O$ is further treated with sulfuric acid ($H_2SO_4$) to yield back $MgSO_4.7H_2O$ which is re-used in the process and also hydrochloric acid (HCl). Moreover, the alcohol is distilled off and re-used in the process. The method allows for the production of $K_2SO_4$ and HCl.

Figure 1:
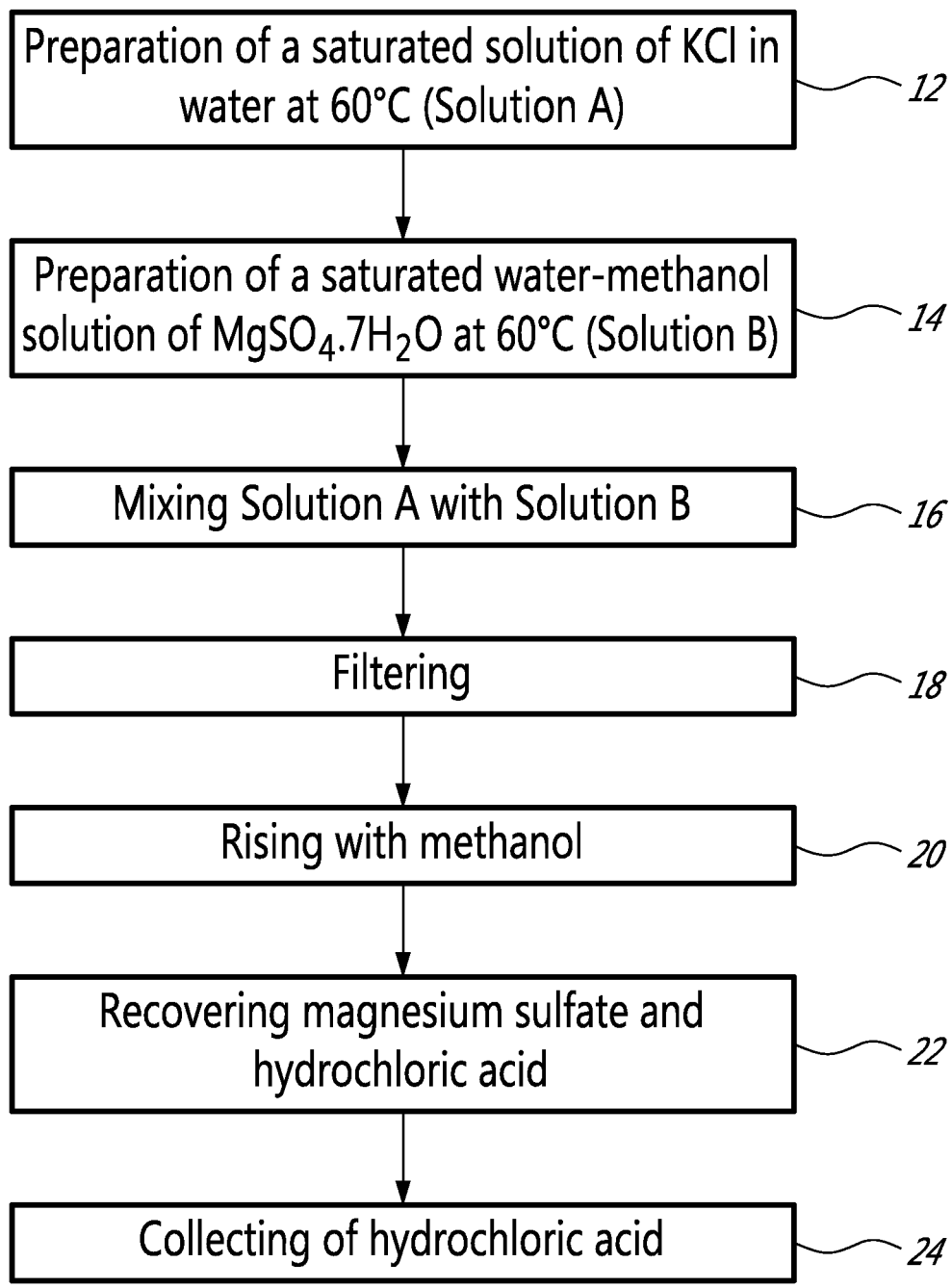
FIG. 1 is a flowchart of a method according to an embodiment of an aspect of the present invention.

More precisely, as illustrated in FIG. 1, a method according to an embodiment of the present invention comprises the preparation of a saturated solution of KCl in water at 60° C. (Solution A) (step 12), then the preparation of a saturated water solution of $MgSO_4.7H_2O$ at 60° C., with addition of methanol until the apparition of cloudiness (Solution B) (step 14). Then, by mixing Solution A with Solution B at 60° C. with good stirring and cooling to room temperature, a precipitation of $K_2SO_4$ is obtained (step 16), which is filtered (step 18) and rinsed with methanol (step 20). The combined filtrate and rinsings are distilled to recover the methanol and crystallize out magnesium chloride hydrate (step 22). This magnesium chloride hydrate is then treated with sulfuric acid in order to recover the initial magnesium sulfate along with hydrochloric acid, a useful product (step 24).

The method is based on the following reaction (I):

$$2KCl + MgSO_4.7H_2O \rightarrow K_2SO_4 + MgCl_2 6H_2O + H_2O \quad (I)$$

As known in the art (Remy, Ibid., p. 199), the presence in solution of $K_2SO_4$ and KCl leads to the formation of a sparingly soluble double salt, schönite ($K_2SO_4.MgSO_4.6H_2O$). Therefore, as soon as some potassium sulfate is formed from the KCl and $MgSO_4.7H_2O$, a precipitation of mixed sulfate of potassium and magnesium is expected.

Surprisingly, it has been found that if the mixing of the potassium chloride solution with the magnesium sulfate solution is done in the presence of methanol, sparingly soluble schönite does not form. Rather, the whole sulfate group is displaced from the magnesium to the potassium in an essentially quantitative way.

The fact that magnesium chloride forms a rather stable complex with methanol ($MgCl_2.6MeOH$) might be the reason why the system represented by reaction (I) is displaced completely to the right. Potassium sulfate is insoluble in methanol, while magnesium chloride is rather soluble in this solvent. Therefore, by rinsing the potassium sulfate with methanol, this salt is freed of most of the magnesium chloride and the resulting $K_2SO_4$ is essentially a chloride-free product, i.e. a product with a chloride content of less than 1%.

The precipitated $K_2SO_4$ is filtrated and the resulting filtrate contains magnesium chloride in methanol and water. Methanol can be distilled off and recycled, and magnesium chloride crystallized out after evaporation of excess water. It has been noted that the hydrate of magnesium chloride reacts smoothly with sulphuric acid to give magnesium sulfate and hydrochloric acid at a temperature comprised in a range between about 110 and about 120° C., as per reaction (II) below:

$$MgCl_2.6H_2O+H_2SO_4+H_2 \rightarrow MgSO_4.7H_2O+2HCl \quad (II)$$

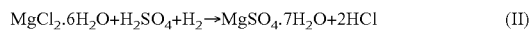

The hydrochloric acid thus formed can be collected by standard procedures, and the magnesium sulfate recycled for the production of potassium sulfate, after recristallisation to get the heptahydrate form.

Therefore, in the present invention, a closed loop approach is taken as far as magnesium sulfate is concerned. By combining reaction (I) and reaction (II), reaction (III) below is obtained:

$$KCl+H_2SO_4 \rightarrow K_2SO_4+HCl \quad (III)$$

As a source of potassium, potassium chloride (KCl) can be used, or carnallite ($KCl.MgCl_2.6H_2O$). In the last case, a larger amount of magnesium chloride is recovered after the filtration of potassium sulfate (reaction IV below).

$$2(KCl.MgCl_2.6H_2O)+MgSO_4.7H_2O \rightarrow K_2SO_4+3(MgCl_2.6H_2O)+H_2O \quad (IV)$$

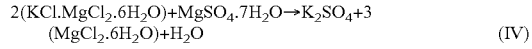

Other relatively low boiling alcohols can be used, such as ethanol or propanol, but methanol may be preferred for its ease of separation from water solution.

As people in the art will be in a position to appreciate, the present invention thus provides a closed-loop method for the production of $K_2SO_4$ using a source of potassium such as KCl and a magnesium sulfate-containing substance such as $MgSO_4.7H_2O$, in the presence of a low boiling point alcohol such as MeOH, and which involves recycling and re-using $MgSO_4.7H_2O$.

Figure 2:
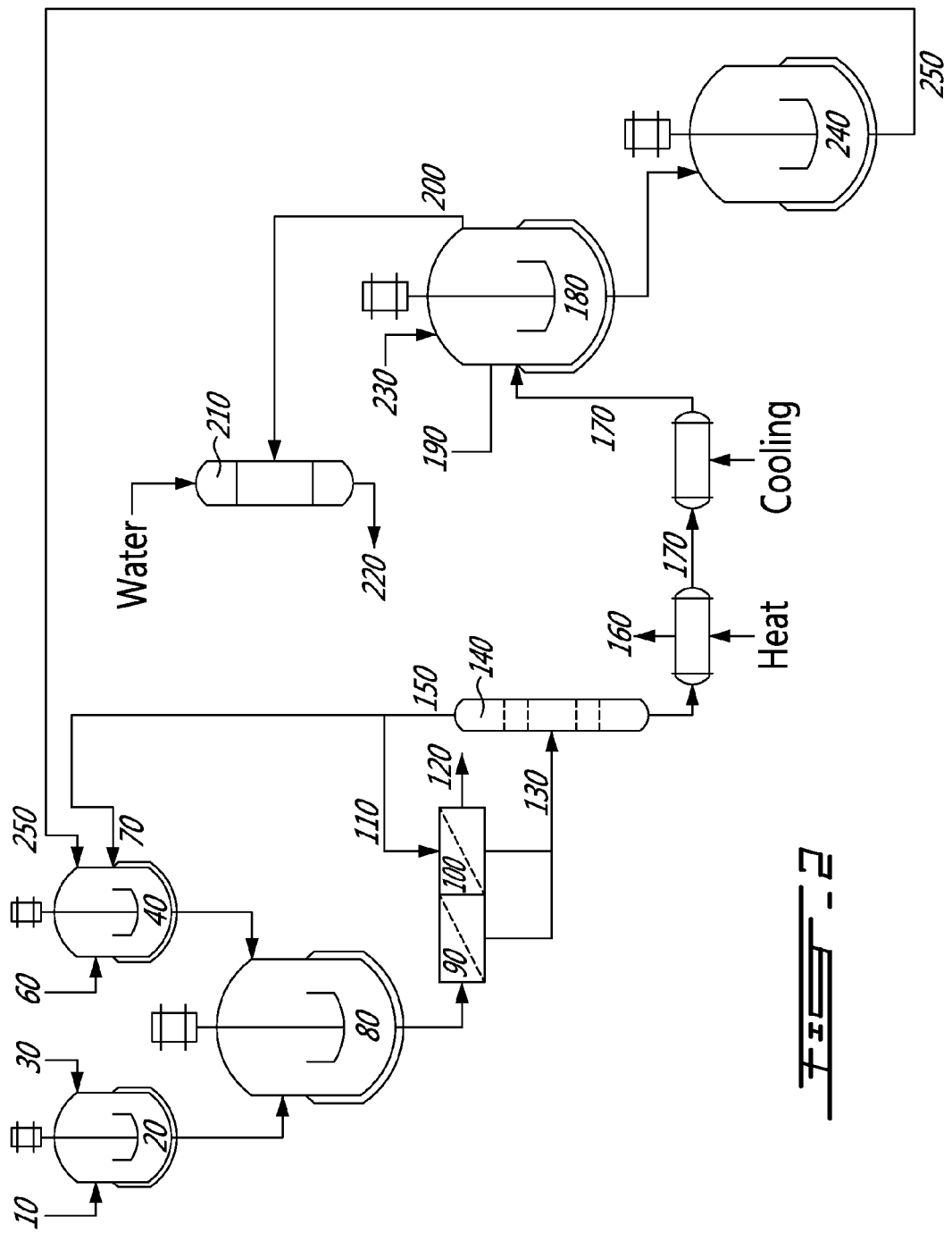
FIG. 2 is a schematic diagram of a system according to an embodiment of an aspect of the present invention.

A system according to an embodiment of another aspect of the present invention is illustrated for example in FIG. 2.

A source of water soluble potassium 10 is dissolved in a first reactor 20 with a minimum amount of water 30, for example at a ratio of water to KCl of about 2:8, at a temperature in a range comprised between about 50° C. and about 65° C. In a second reactor 40, magnesium sulfate hydrate 50 is dissolved in a minimum amount of water 60, for example with a ratio of 0.7 water to $MgSO_4.7H_2O$ of about 0.7 w/w, at a temperature in a range comprised between about 50 and about 65° C. and an amount of methanol 70 at a temperature in a range comprised between about 35° C. and 45° C., for example 40° C., is added to the second reactor 40 so as to be near precipitation point. The content of the first 20 and second 40 reactors are then rapidly, i.e. in a range of seconds, mixed in a third reactor 80 with good stirring, typically at between about 100 and about 150 rpm for example, and then allowed to cool down as soon as possible to a temperature in a range comprised between about 0 and about 5° C. The slurry is then filtered in a filter 90, and the solid 100 is rinsed with methanol 110 to give pure, chloride-free potassium sulfate 120. The combined filtrate and rinsings 130 are then distilled with a column 140, first to isolate methanol 150 which is recycled to 70 and 110. Further distillation of water 160 gives a concentrated solution of magnesium chloride 170, which crystallizes upon cooling. The concentrate 170 is placed in a fourth reactor 180 and is treated there at a temperature in a range comprised between about 90° C. and about 120° C. with sulfuric acid 190. The resulting hydrochloric acid 200 is absorbed in a collector 210 as a 32% HCl solution 220. The residual mass in the fourth reactor 180 is collected with a minimum (at a ratio of 0.4 w/w water to $MgSO_4.7H_2O$ for example), of hot water 230, between about 90° C. and 100° C. for example, and allowed to crystallize in a fifth reactor 240 and recycled to the second reactor 40 as magnesium sulfate heptahydrate 250.

This system allows the production of potassium sulfate of high purity, containing less than 1% chlorides. The temperatures of operation are low, typically below about 65° C., and the recycling of magnesium sulfate takes places at temperatures typically below about 120° C., with the production of hydrochloric acid as a useful secondary product.

With the recycling of magnesium sulfate as intermediate step, the high temperature, low energy efficiencies and corrosive situations along with chloride contamination common to existing processes are thus avoided. The use of a broad spectrum of potassium sources also adds to the flexibility of the process.

The following examples illustrate particular ways of implementing the present invention.

In a first example, for the production of magnesium sulfate, starting with 300 g of magnesium chloride hexahydrate obtained from previous potassium sulfate production, this chloride is treated with 175.8 g of sulfuric acid 96% in a one litre beaker. The temperature is raised to 120° C. and the operation is accompanied with the evolution of HCl. Twice a 20 mL portion of water is added and distilled in order to complete the stripping of hydrochloric acid. The weight of the residual solid is 255 g. This solid is taken up with water (500 mL) in order to re-cristallise the magnesium sulfate heptahydrate after evaporation of 100 mL of water. After drying at 70° C., a crop of 244 g of magnesium sulfate heptahydrate is obtained. The mother liquor from this crystalllisation can be recycled in further operation.

In another example, for the preparation of a potassium chloride solution, 121 g of potassium chloride is dissolved in 335 mL of water at 60° C. in a 1.4 L beaker.

In still another example, for the preparation of a magnesium sulfate solution, a 200 g sample from (1) is dissolved in 142 mL of water at 60° C., in a one litre beaker. Then, 230 mL of warm methanol (40° C.) is added slowly with good stirring to the solution of magnesium sulfate.

For the precipitation of potassium sulfate, a warm methanolic solution of magnesium sulfate is poured into the warm potassium chloride (2) rapidly with good stirring There is a partial precipitation and the mixture is cooled at a temperature comprised in a range between about 0 and about 5° C.

The crystalline mass is filtered, rinsed with 600 mL of methanol and dried at about 100° C., giving a crop of 113 g of $K_2SO_4$. The determination of chlorides indicated 0.3% $Cl^-$ in the $K_2SO_4$.

For recycling of materials, by evaporation of the mother liquor and methanol rinsings, the methanol was recovered (800 mL) and the residual water solution evaporated to yield magnesium chloride hexahydrate as per (1).

Although the present invention has been described hereinabove by way of embodiments thereof, it may be modified, without departing from the nature and teachings of the subject invention as defined in the appended claims.

The invention claimed is:

1. A method for the production of potassium sulfate, comprising reacting a chloride of potassium with a magnesium sulfate in an aqueous alcoholic solution, with recycling of magnesium sulfate and production of hydrochloric acid, wherein the recycling of magnesium is done by a reaction of sulfuric acid on resulting magnesium chloride with corresponding production of magnesium sulfate and hydrochloric acid.

2. The method as in claim 1, where the temperature of the reaction of sulfuric acid on the resulting magnesium chloride is a range comprised between 90 and 120° C.

3. The method as in claim 1, where hydrochloric acid is collected as a solution of about 15 to 32% HCl in water.

4. A method for the production of potassium sulfate comprising reacting a source of water soluble potassium with a magnesium sulfate-containing substance in presence of an aqueous alcoholic solution, wherein said reacting the source of water soluble potassium with the magnesium sulfate-containing substance in presence of the aqueous alcoholic solution is performed at a temperature in a range comprised between 50 and 65° C.

5. The method as in claim 4, where the source of potassium is KCl.

6. The method as in claim 4, where the source of potassium is carnallite.

7. The method as in claim 4, where the aqueous alcoholic solution comprises a low boiling alcohol.

8. The method as in claim 4, where the aqueous alcoholic solution comprises one of: methanol, propanol and ethanol.

9. A system for the production of potassium sulfate, comprising:
   a first reactor for dissolving a water soluble potassium in water into a first solution;
   a second reactor for dissolving magnesium sulfate hydrate in water and adding methanol into a second solution;
   a third reactor, adapted to receive the first and the second solutions, mixed then under stirring and cool them down into a slurry;
   a filter collecting and filtering the slurry from the third reactor; delivering, after rinsing of the solid part with methanol, chloride-free potassium sulfate, and a combined filtrate and rinsings;
   a column receiving and distilling the combined filtrate and rinsings, delivering methanol back to the second reactor and to the filter and a concentrated solution of magnesium chloride;
   a fourth reactor, adapted to receive the concentrated solution of magnesium chloride, which crystallizes upon cooling, and to treat the concentrate with sulfuric acid, delivering hydrochloric acid and a residual mass;
   a collector, adapted to absorb the hydrochloric acid delivered form from the fourth reactor; and
   a fifth reactor, adapted to collect and crystallise the residual mass from the fourth reactor, for recycling to the second reactor as magnesium sulfate heptahydrate.

\* \* \* \* \*